United States Patent [19]
Singh et al.

[11] Patent Number: 6,051,196
[45] Date of Patent: Apr. 18, 2000

[54] PURIFICATION OF PHOSPHORUS CONTAINING SCHEELITE ORE

[75] Inventors: Raj P. Singh, Sayre; Michael J. Miller; Thomas A. Wolfe, both of Towanda, all of Pa.

[73] Assignee: Osram Sylvania Inc., Danvers, Mass.

[21] Appl. No.: 09/247,745

[22] Filed: Feb. 9, 1999

Related U.S. Application Data

[60] Provisional application No. 60/074,171, Feb. 9, 1998.

[51] Int. Cl.[7] .............................. C01G 41/00; C01F 1/00; C22B 26/00; C01B 25/32
[52] U.S. Cl. ..................... 423/53; 423/155; 423/157.3; 423/157.5
[58] Field of Search .................... 423/53, 155, 157.5, 423/157.3, 299, 300

[56] References Cited

U.S. PATENT DOCUMENTS

| | | | |
|---|---|---|---|
| 3,915,391 | 10/1975 | Mercade | 241/20 |
| 4,040,519 | 8/1977 | Fukazawa | 423/157.3 |
| 4,349,515 | 9/1982 | Muller | 423/58 |
| 4,910,000 | 3/1990 | Davey | 423/53 |

*Primary Examiner*—Steven Bos
*Attorney, Agent, or Firm*—Robert F. Clark

[57] ABSTRACT

A method for purifying a phosphorus containing scheelite ore is described wherein the calcite phase is selectively dissolved prior to dissolution of the apatite phase. Selective dissolution of the calcite produces several benefits: (1) a usable calcium solution, (2) enhanced apatite dissolution, and (3) lower volumes of toxic acid solution for disposal.

9 Claims, No Drawings

PURIFICATION OF PHOSPHORUS CONTAINING SCHEELITE ORE

REFERENCES TO RELATED APPLICATIONS

This Application claims the benefit of U.S. Provisional Application Ser. No. 60/074,171, filed Feb. 9, 1998.

TECHNICAL FIELD

This invention relates to the processing of tungsten ores. More particularly, this invention relates to the purification of phosphorus containing scheelite ores.

BACKGROUND ART

The mineral scheelite (calcium tungstate, $CaWO_4$) is normally found in quartz veins and in contact with scarn ores of complex mineralogical composition. These scarn minerals include garnets, pyroxene, and amphibole, and other minerals such as calcite, apatite and quartz. Scheelite ores can be classified into five different categories 1) simple scheelite ore, 2) scheelite-sulfides ore, 3) scheelite-cassiterite ore, 4) scheelite-calcite-apatite ore and 5) scheelite-powellite ore. Normally, the concentration of $WO_3$ in a scheelite ore concentrate is expected to be more than 60 weight percent (wt. %) However, low grade ores with $WO_3$ content as low as 13.9 wt. % are reported. These low grade ores are associated with calcium containing phases other than scheelite such as calcite and calcium hydroxyapatite. Such ores cannot be processed by typical hydrometallurgical methods and require pretreatment to remove the phosphorus contained in the apatite phase. The ores may also contain toxic elements such as lead, arsenic and uranium. Although methods of phosphorus removal are known, it would be an advantage to have a simplified process for phosphorus removal in order to improve the economics associated with processing low grade scheelite ores.

SUMMARY OF THE INVENTION

It is an object of the invention to obviate the disadvantages of the prior art.

It is another object of the invention to provide a more economical method for processing phosphorus containing scheelite ores.

It is a further object of the invention to provide a more environmentally acceptable method for processing phosphorus containing scheelite ores.

In accordance with the objects of the invention, there is provided a method for purifying a phosphorus containing scheelite ore comprising:

contacting a scheelite ore comprising scheelite, apatite, and calcite phases with a volume of dilute hydrochloric acid to form a calcium containing solution and a calcite-depleted ore, the dilute hydrochloric acid having a concentration sufficient to dissolve the calcite phase without substantially dissolving the apatite phase;

separating the calcium containing solution from the calcite-depleted ore;

contacting the calcite-depleted ore with a volume of a concentrated hydrochloric acid to form a phosphorus containing solution and a scheelite containing residue, the concentrated hydrochloric acid having a concentration sufficient to dissolve the apatite phase;

separating the scheelite containing residue from the phosphorus containing solution.

In accordance with one aspect of the invention, the method is performed at a temperature from about 20° C. to about 60° C.

In accordance with another aspect of the invention, the method is performed using a slurry density from about 24 to about 72 g of ore per 100 ml of acid.

DESCRIPTION OF THE PREFERRED EMBODIMENTS

For a better understanding of the present invention, together with other and further objects, advantages and capabilities thereof, reference is made to the following disclosure and appended claims.

Typically, the toxic elements in the low grade scheelite ores are associated with the apatite phase. We have discovered that in ores which contain both apatite and calcite phases the calcite can be selectively removed with dilute hydrochloric (HCl) acid prior to removing the apatite phase. The resulting calcium containing solution can then be used for other applications, such as the synthesis of calcium compounds, since the toxic elements remain in the apatite. The phosphorus containing apatite can then be removed from the ore with a more concentrated HCl acid. The second solution contains toxic elements such as arsenic, lead and uranium and can be carefully disposed of. The selective dissolution of the calcite phase makes the subsequent dissolution of the apatite phase more efficient. If the calcite is not removed first, the higher levels of calcium caused by the calcite dissolution would inhibit the dissolution of the apatite by common ion effect as well as by re-precipitation of phosphate ions (as calcium phosphate). Thus, selective dissolution of the calcite produces several benefits: (1) a usable calcium solution, (2) enhanced apatite dissolution, and (3) lower volumes of toxic acid solution for disposal.

The following non-limiting examples are presented.

EXAMPLES

A series of samples of a low grade scheelite ore concentrate containing by weight about 65% $CaWO_4$, 18% $CaCO_3$ (calcite), 14% $Ca_{10}(PO_4)_6(OH)_2$ (apatite) and 3% $SiO_2$ were processed under the following conditions. In addition to the major phases, the ore concentrate contained trace amounts (less than 0.05 wt. %) of arsenic, lead and uranium. Phase identification of the ore was carried out by powdered X-ray Diffraction (XRD). Wavelength Dispersive X-ray Fluorescence Spectrometry (WD-XRF) was used for quantitative chemical analysis. Trace concentrations of As and U were determined by Glow Discharge Mass Spectrometry (GDMS).

An amount of the ore was weighed in a flask. A volume of a dilute hydrochloric acid (0.1 M) or a concentrated hydrochloric acid (3 M) was added and the stoppered flask was placed in a constant temperature bath and agitated. The slurry density was 24 or 72 g ore/100 ml and the temperature was 20° C. or 60° C. After two hours, the slurry was filtered and the filtrate analyzed. The solid residue was washed with water, dried at 110° C., weighed and submitted for WD-XRF, XRD and GDMS analyses.

TABLE 1

| Example | Slurry Density (g ore per 100 ml) | HCl conc. (M) | Temp. (° C.) | P (mg/L) | As (mg/L) | W (mg/L) | W Efficiency (%) |
|---|---|---|---|---|---|---|---|
| 1 | 24 | 0.1 | 20 | 0 | 0 | 0 | >99.9 |
| 2 | 72 | 0.1 | 20 | 0 | 0 | 0 | >99.9 |
| 3 | 24 | 3 | 20 | 6500 | 15 | 1700 | 98.2 |
| 4 | 72 | 3 | 20 | 11000 | 43 | 610 | 99.8 |
| 5 | 24 | 0.1 | 60 | 1.3 | 0 | 0 | >99.9 |
| 6 | 72 | 0.1 | 60 | 0.64 | 0 | 0 | >99.9 |
| 7 | 24 | 3 | 60 | 6300 | 12 | 2100 | 96.9 |
| 8 | 72 | 3 | 60 | 9400 | 33 | 980 | 99.7 | amounts of P, As, and W detected in the filtrate for each set of conditions are shown in Table 1 (mg/L). Tungsten efficiency is defined as the weight of tungsten in the recovered ore divided by the sum of the weight of tungsten in the recovered ore plus the weight of tungsten in the filtrate.

At a dilute hydrochloric acid concentration of 0.1 M, a substantial amount of the calcite phase (>60%) was dissolved. No significant amounts of P, As, or W were detected in the filtrate indicating selective dissolution of the calcite phase over the apatite and scheelite phases.

When 3M HCl was used, the filtrate contained both P and As indicating dissolution of the apatite phase (along with the calcite phase). A small amount of tungsten was detected in the 3M HCl filtrate. However, the tungsten recovery efficiency in all examples was at least about 97%. The filtrate from the dissolution in 3M HCl contained the toxic elements, As, U and Pb.

These examples demonstrate that the calcite phase can be selectively dissolved from the scheelite ore without dissolving the apatite phase. The apatite phase can then be removed from the calcite-depleted ore using a more concentrated hydrochloric acid. Depending upon the relative amounts of the scheelite, calcite and apatite phases in the ore, adjustments can be made to the slurry density to optimize the effectiveness of the selective dissolution.

While there has been shown and described what are at the present considered the preferred embodiments of the invention, it will be obvious to those skilled in the art that various changes and modifications may be made therein without departing from the scope of the invention as defined by the appended claims.

We claim:

1. A method for purifying a phosphorus containing scheelite ore comprising:

contacting a scheelite ore comprising scheelite, apatite, and calcite phases with a volume of dilute hydrochloric acid to form a calcium containing solution and a calcite-depleted ore, the dilute hydrochloric acid having a concentration sufficient to dissolve the calcite phase without substantially dissolving the apatite phase;

separating the calcium containing solution from the calcite-depleted ore;

contacting the calcite-depleted ore with a volume of a concentrated hydrochloric acid to form a phosphorus containing solution and a scheelite containing residue, the concentrated hydrochloric acid having a concentration sufficient to dissolve the apatite phase;

separating the scheelite containing residue from the phosphorus containing solution.

2. The method of claim 1 wherein the dilute hydrochloric acid has a concentration of 0.1 M.

3. The method of claim 2 where the concentrated hydrochloric acid has a concentration of 3 M.

4. The method of claim 3 wherein the method is performed at a temperature of from about 20° C. to about 60° C.

5. The method of claim 3 wherein the method is performed using a slurry density of from about 24 to about 72 g of ore per 100 ml of acid.

6. The method of claim 2 wherein the calcite phase is substantially dissolved in the dilute hydrochloric acid.

7. The method of claim 1 wherein the method has a tungsten recovery efficiency of at least about 97%.

8. A method for purifying a phosphorus containing scheelite ore comprising:

forming a first slurry of a scheelite ore comprising scheelite, apatite, and calcite phases and 0.1 M hydrochloric acid, the first slurry having a slurry density of from about 24 to about 72 g of ore per 100 ml of acid and a temperature from about 20° C. to about 60° C.;

filtering the first slurry to obtain a calcium containing solution and a calcite-depleted ore;

forming a second slurry of the calcite-depleted ore and 3 M hydrochloric acid, the second slurry having a slurry density of from about 24 to about 72 g of ore per 100 ml of acid and a temperature from about 20° C. to about 60° C.; and filtering the second slurry to obtain a phosphorus containing solution and a scheelite containing residue.

9. The method of claim 8 wherein the method has a tungsten recovery efficiency of at least about 97%.

* * * * *